United States Patent [19]

Takei

[11] Patent Number: 5,606,256
[45] Date of Patent: Feb. 25, 1997

[54] LINEAR ENCODER AND A GUIDE UNIT ON WHICH IT IS EQUIPPED

[75] Inventor: Seiji Takei, Kanagawa-ken, Japan

[73] Assignee: Nippon Thompson Co., Ltd., Tokyo, Japan

[21] Appl. No.: 480,942

[22] Filed: Jun. 7, 1995

Related U.S. Application Data

[63] Continuation of Ser. No. 67,678, May 26, 1993, abandoned.

[30] Foreign Application Priority Data

Jun. 8, 1992 [JP] Japan .................................. 4-173889

[51] Int. Cl.⁶ .............................. G01B 7/14; G01B 7/00; H02K 41/02
[52] U.S. Cl. ...................... 324/207.21; 310/12; 318/135; 324/207.24; 341/15
[58] Field of Search .................................. 324/173, 174, 324/207.2, 207.21, 207.22, 207.24, 251, 252; 310/12; 318/135, 687; 341/15

[56] References Cited

U.S. PATENT DOCUMENTS

| | | |
|---|---|---|
| 3,329,833 | 7/1967 | Dorsch . |
| 3,820,110 | 6/1974 | Henrich et al. .......................... 341/15 |
| 4,658,214 | 4/1987 | Petersen ...................... 324/207.24 |
| 5,023,495 | 6/1991 | Ohsaka et al. ..................... 318/135 X |
| 5,029,304 | 7/1991 | Tolmie, Jr. ..................... 324/207.2 X |
| 5,047,676 | 9/1991 | Ichikawa .............................. 318/135 X |
| 5,141,183 | 8/1992 | Jurkowski et al. .............. 34/207.24 X |
| 5,142,225 | 8/1992 | Gerlach et al. ................ 324/207.24 X |
| 5,179,304 | 1/1993 | Kenjo et al. ............................. 310/12 |
| 5,225,725 | 7/1993 | Shiraki et al. ....................... 318/135 X |
| 5,229,669 | 7/1993 | Takei .................................... 318/135 X |
| 5,302,893 | 4/1994 | Yoshimura ..................... 324/207.24 X |
| 5,416,396 | 5/1995 | Takei .................................... 318/687 X |

FOREIGN PATENT DOCUMENTS

| | | | |
|---|---|---|---|
| 4021105 | 2/1991 | Germany ............................. 324/207 |
| 0079410 | 5/1982 | Japan .............................. 324/207.22 |
| 0056903 | 3/1986 | Japan .............................. 324/207.22 |
| 351914 | 12/1992 | Japan ..................................... 341/15 |
| 0129303 | 8/1993 | Japan .............................. 324/207.22 |

OTHER PUBLICATIONS

Uemura, Saburo; Metrology Sony Magnescale, *Japan Electronic Engineering*, Nov. 1969, pp. 20–23.

*Primary Examiner*—Gerard R. Strecker
*Attorney, Agent, or Firm*—Sughrue, Mion, Zinn, Macpeak & Seas

[57] ABSTRACT

The present invention relates to a linear encoder that does not require the connection cable to be pulled around and has a simple constitution, while also contributing to smooth operation of the moving side as well as reduced size of the apparatus. In addition, the present invention also relates to a guide wherein a guiding device composed of a track rail and so forth is added to the linear encoder. In addition to arranging a plurality of detecting elements composed of electromagnetic conversion elements and so forth at prescribed intervals along the direction of relative motion on the stationary side, a detected element composed of a permanent magnet is arranged so as to oppose the above-mentioned detecting elements on the moving side, thus obtaining the above-mentioned effects.

8 Claims, 6 Drawing Sheets

LINEAR ENCODER AND A GUIDE UNIT ON WHICH IT IS EQUIPPED

This is a continuation Application of application Ser. No. 08/067,078 filed May 26, 1993, now abandoned.

BACKGROUND OF THE INVENTION

1. Field of the Invention

The present invention relates to a linear encoder for performing positional detection of relative motion that is used in mechanisms that perform said relative motion such as, for example, machine tools and industrial robots, and to a guide unit formed by adding a guiding device, having a track rail and so forth, that guides said relative motion, to said linear encoder.

2. Description of the Prior Art

An example of an apparatus of the prior art containing this type of guide unit is the direct drive unit indicated in FIG. 1. In contrast to a guide unit comprising the above-mentioned linear encoder and guiding device, this direct drive unit is provided with, for example, a linear motor for the driving device.

As indicated in FIG. 1, said direct drive unit has two track rails 2 that are mounted in parallel on base 1 and in which tracks are formed in the lengthwise direction in each to serve as a guiding device, and a slider 4 that is straddled across both said track rails 2 and guided by said tracks. In addition, a linear motor has a primary side (not shown) and a secondary side 6. Said primary side is composed of mutually connected permanent magnets and electromagnets and attached to the bottom surface of said slider 4. The secondary side 6 is composed of rectangular members wherein a plurality of inductor teeth (reference numeral not shown), having high magnetic permeability, are formed so as to be arranged in a row in the direction of the tracks. These inductor teeth and the magnetic poles of the above-mentioned electromagnets are arranged relative to each other.

On the other hand, a linear encoder is arranged on base 1 along one of track rails 2. Said linear encoder has a detected element in the form of a multipolar magnetized, long permanent magnet 8, wherein magnetic poles (N and S) are arranged in alternating fashion in a direction parallel to the tracks of said track rails 2, and an electromagnetic conversion element (not shown) in the form of a detecting element mounted on the bottom surface of the side of slider 4 so as to oppose said permanent magnet 8. The current position of slider 4 can be detected from the output of said electromagnetic conversion element that moves together with said slider 4 so as to travel longitudinally along permanent magnet 8.

Furthermore, reference number 9 in FIG. 1 indicates a cable guide housing a connection cable (not shown) for supplying a power source to the above-mentioned primary side of the linear motor, as well as for obtaining the output generated by the above-mentioned electromagnetic conversion element. As indicated in this figure, this cable guide 9 is composed of a plurality of links coupled in a row so as to be able to mutually pivot freely. Together with being formed so that said connection cable maintains a prescribed curvature even during movement of slider 4, it also serves to protect said connection cable from damage.

In the linear encoder equipped on the above-mentioned direct drive unit, since an electromagnetic conversion element is arranged on slider 4, the connection cable for obtaining the output signals from said electromagnetic conversion element must be arranged so as to be pulled around the entire moving range of slider 4. Moreover, cable guide 9 and so forth are also required which together with making the constitution complex, has the shortcoming of hindering smooth operation on the moving side, including slider 4, by the above-mentioned connection cable and cable guide 9.

In addition, since permanent magnet 8 equipped on the above-mentioned linear encoder is of a long shape, there is the additional shortcoming of the entire apparatus in which said linear encoder is incorporated being large in size.

SUMMARY OF THE INVENTION

Thus, in consideration of the above-mentioned shortcomings of the prior art, a first object of the present invention is to provide a linear encoder that does not require the connection cable to be pulled around and has a simple constitution, while also contributing to smooth operation of the moving side as well as reduced size of the apparatus. In addition, a second object of the present invention is to provide a guide unit equipped with said linear encoder in addition to a guiding device composed of a track rail and so forth.

The present invention is a linear encoder that performs positional detection of relative motion of two objects, comprising a plurality of detecting elements arranged in a row at prescribed intervals along the direction of relative motion with respect to the stationary side of each of the objects performing relative motion, and a detected element arranged on the moving side corresponding to the above-mentioned stationary side so as to be able to oppose the above-mentioned detecting elements.

In addition, the present invention is a guide unit equipped with a track rail in which tracks are formed in the lengthwise direction, a slider guided by the above-mentioned tracks, and a linear encoder for detecting the position of the above-mentioned slider with respect to the above-mentioned track rail, wherein, the above-mentioned linear encoder is composed of a plurality of detecting elements arranged in a row at prescribed intervals along the above-mentioned tracks on the above-mentioned track rail, and a detected element arranged on the above-mentioned slider so as to be able to oppose the above-mentioned detecting elements.

DESCRIPTION OF THE PREFERRED EMBODIMENTS

The following provides an explanation of the direct drive unit, including a linear encoder and guide unit, in the form of embodiments of the present invention with reference to the drawings.

First, the following provides an explanation of the constitution of the guide unit pertaining to the present invention.

Figure 1:
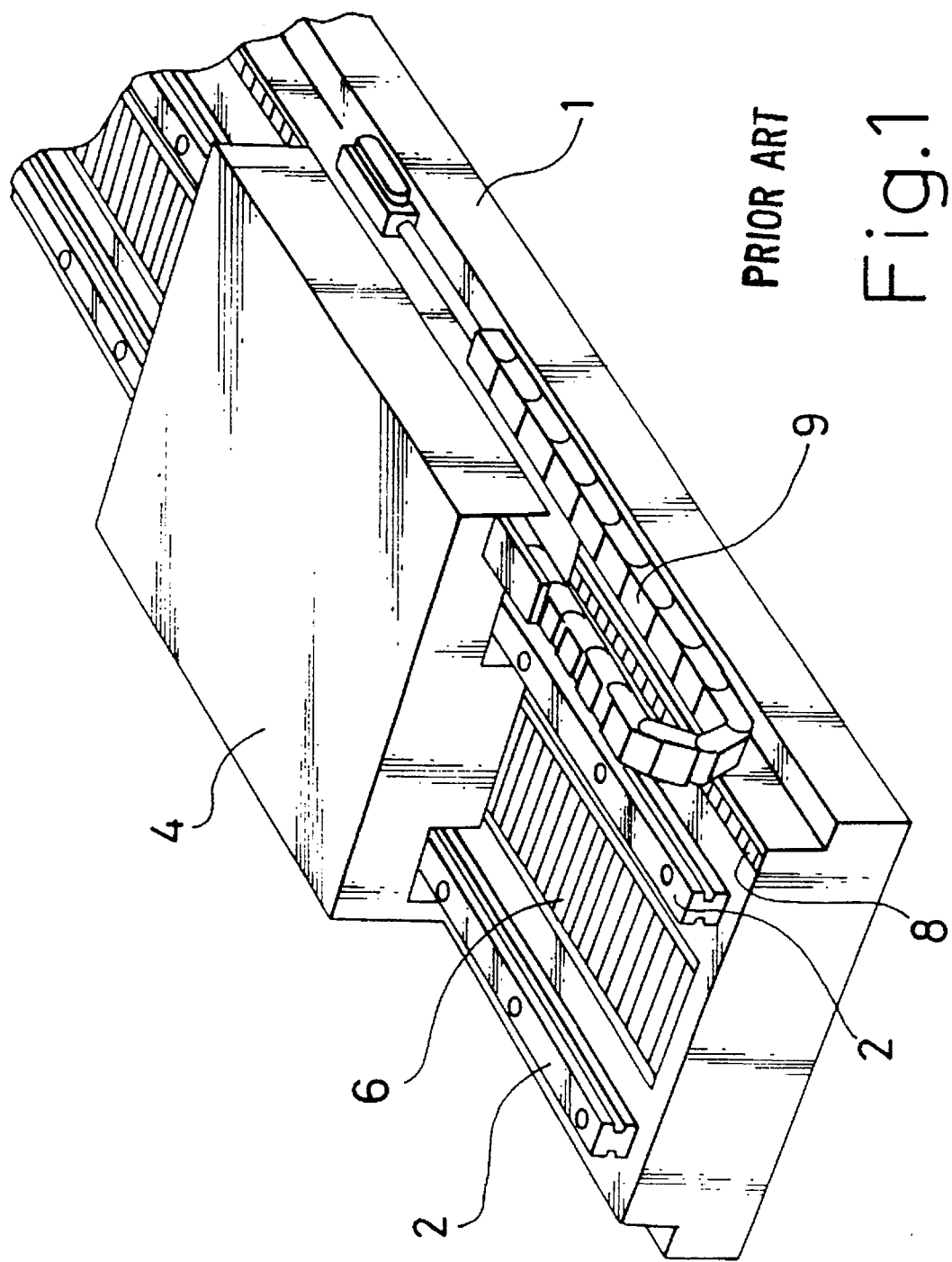
FIG. 1 is a perspective view of the essential components of a direct drive unit containing a linear encoder and guide unit of the prior art.
Figure 2:
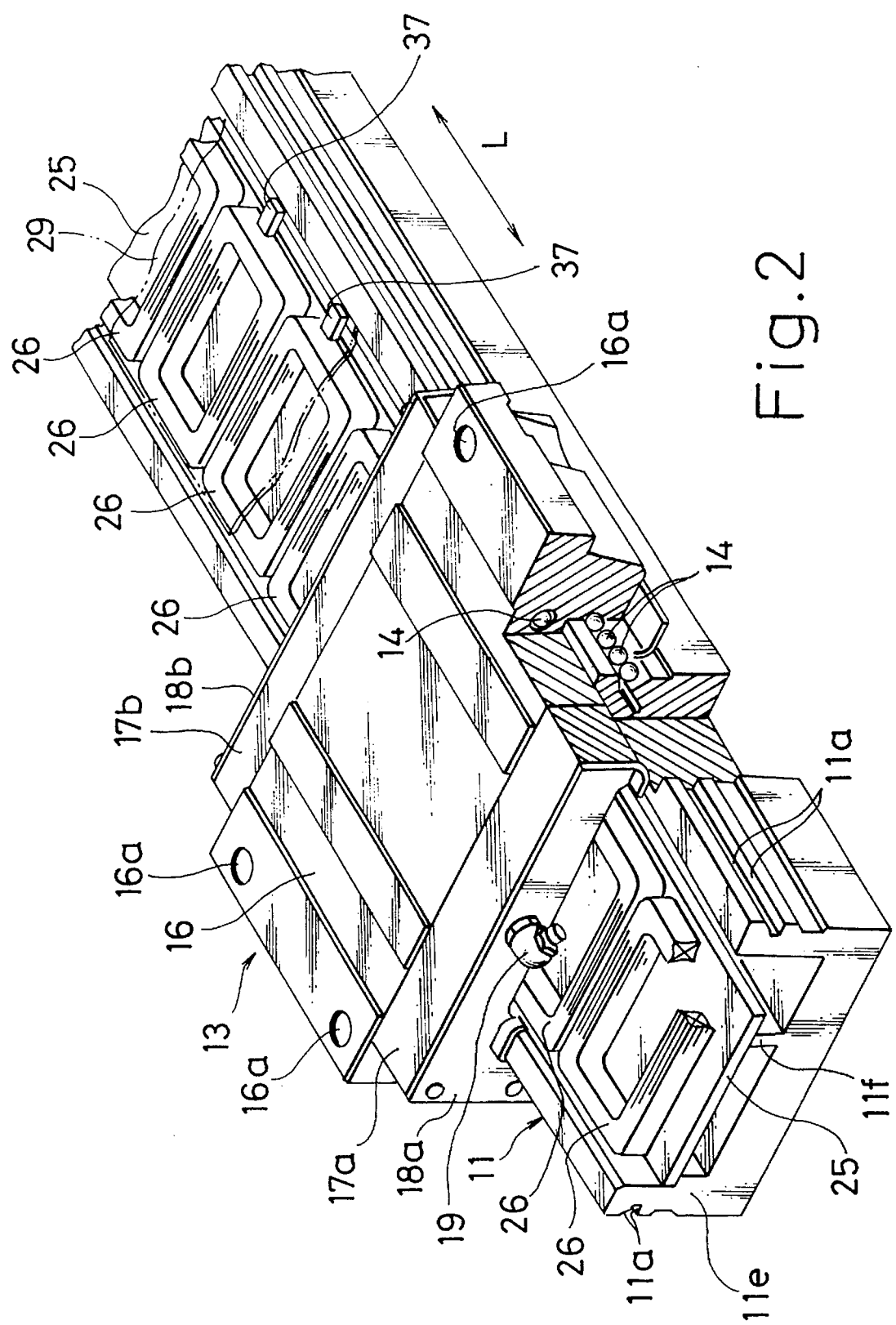
FIG. 2 is a perspective view, including a partial cross-section, of the essential components of the direct drive unit containing a linear encoder and guide unit pertaining to the present invention.
Figure 3:
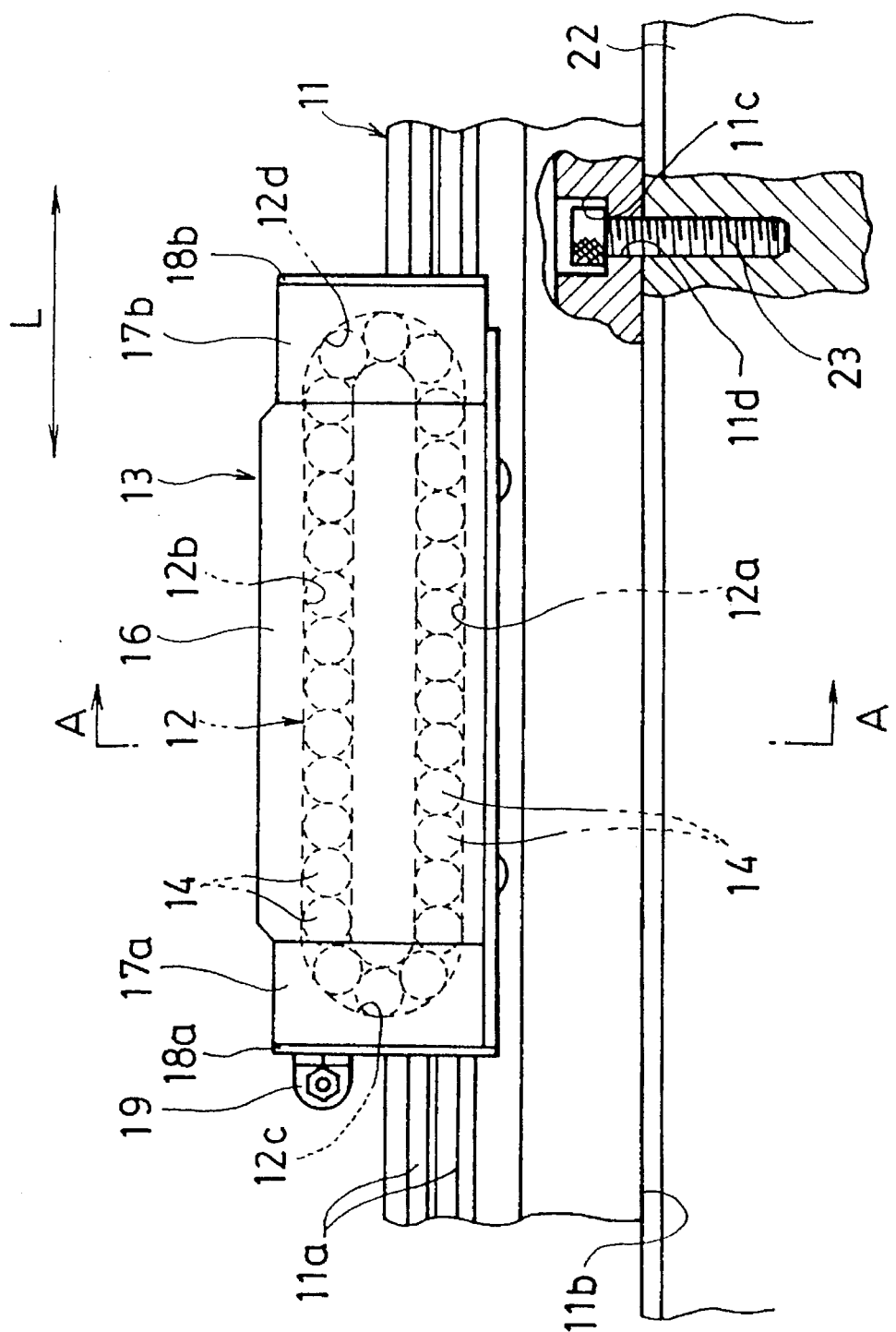
FIG. 3 is a side view, including a partial cross-section, indicating the direct drive unit indicated in FIG. 2 provided on a base.
Figure 4:
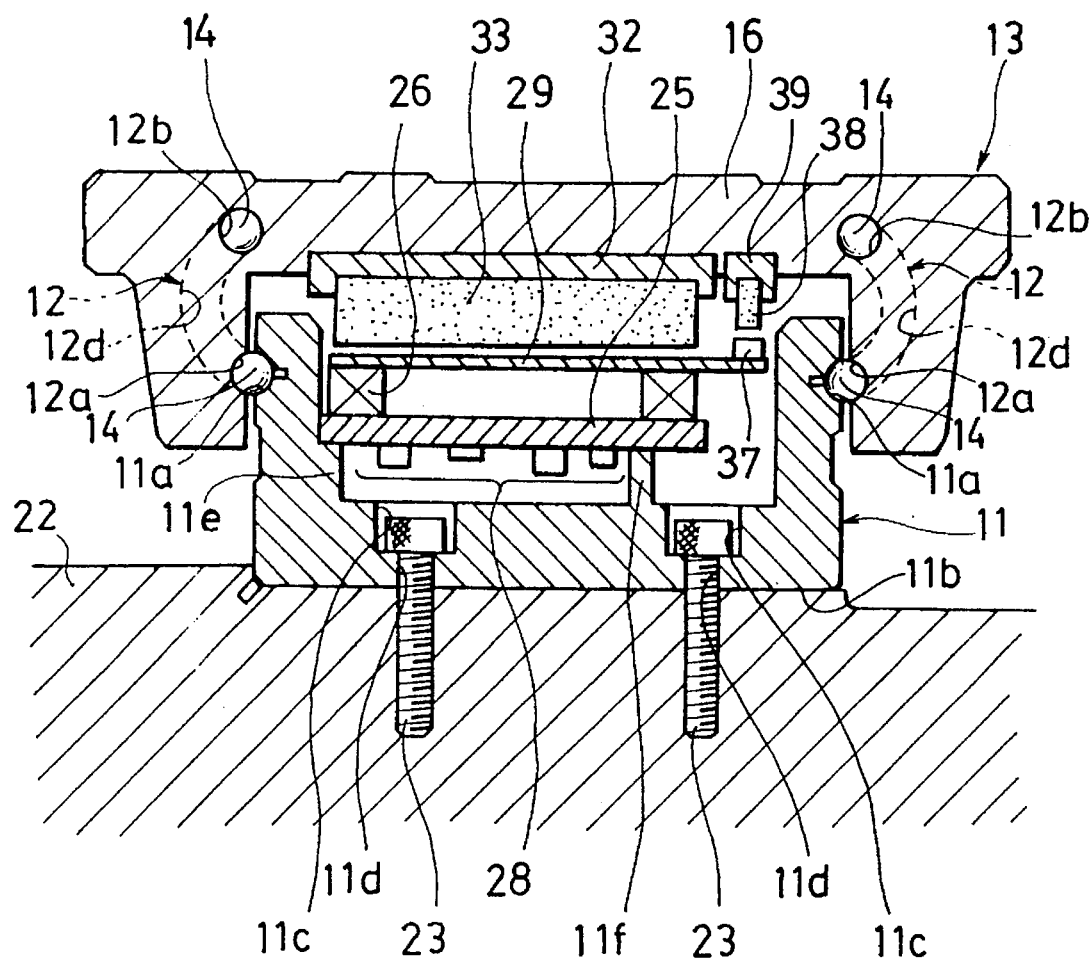
FIG. 4 is a cross-sectional view taken along line A—A relating to FIG. 3.

As indicated in FIGS. 2 through 4, this guide unit has track rail 11, formed so that the shape of the cross-section perpendicular to its lengthwise direction is roughly that of the letter "U" opened upward, rolling element circulating path 12 (reference numeral indicated in FIGS. 3 and 4, to be described in detail to follow), and a slider able to perform relative motion with respect to said track rail 11 in the form of sliding unit 13. One each of tracks having a roughly semi-circular cross-section, in the form of track grooves 11a, are formed in the lengthwise direction on the right and left outer sides of track rail 11. However, the number of these track grooves 11a is not necessarily limited to two. Two of the above-mentioned rolling element circulating paths 12 are provided to correspond to each of these track grooves 11a. A plurality of balls 14 are arranged and contained within said rolling element circulating paths 12 to bear the load between track rail 11 and sliding unit 13. The balls 14 circulate while rolling over the track grooves 11a with movement of the sliding unit 13.

Sliding unit 13 has casing 16 straddled across track rail 11, a pair of end caps 17a and 17b connected to both ends of said casing 16, and two seals 18a and 18b attached to each of the outer surfaces of said end caps 17a and 17b. Furthermore, grease nipple 19 for supplying grease to the above-mentioned balls 14 is attached to end cap 17a. As indicated in FIGS. 3 and 4, each rolling element circulating path 12 is composed of load bearing track groove 12a and return path 12b formed linearly and mutually in parallel on both the left and right ends of casing 16, and a pair of roughly semi-circular direction changing paths 12c and 12d that are formed in both end caps 17a and 17b and that connect said load bearing track groove 12a and return path 12b at both ends. Furthermore, the above-mentioned load bearing track groove 12a is opposed to track groove 11a of track rail 11.

The guide unit having the above-mentioned constitution is arranged on, for example, a frame indicated in FIGS. 3 and 4 (the entire frame is not shown), or in other words, an object of the stationary side in the form of a flat base 22. Track rail 11 is fastened to said base 22 by a plurality of fastening members in the form of bolts (with hexagon sockets) 23. Therefore, track rail 11 has a flat mounting surface 11b on its bottom for mounting to base 22. Furthermore, as indicated in FIGS. 3 and 4, countersunk portions 11c, having a diameter larger than the heads of said bolts 23, and holes 11d, having a diameter slightly larger than the threaded portions of bolts 23, are arranged mutually concentrically and in a row in the lengthwise direction of said track rail 11. Bolts 23 are screwed into base 22 by being inserted into said countersunk portions 11c and holes 11d so that they are completely embedded. In addition, as indicated in FIG. 2, a plurality of threaded holes 16a are formed in the upper surface of casing 16 of sliding unit 13 to allow fastening of a workpiece and so forth to said casing 16 by screwing bolts (with hexagon sockets, not shown) into these threaded holes 16a.

Next, the following provides a detailed description of the linear motor provided in the form of a driving device.

As indicated in FIGS. 2 and 4, the primary side of said linear motor has rectangular plate-shaped coil yoke 25, provided so as to extend over roughly the entire length of track rail 11 on said track rail 11, and a plurality of armature coils 26 arranged in a row on said coil yoke 25. Furthermore, coil yoke 25 is arranged near the bottom of track rail 11, which is formed so that the shape of its cross-section is in the shape of the letter "U" opened upward. More specifically, one each of support ledge 11e and support projection 11f is formed mutually in parallel near the bottom of track rail 11 in said track rail 11. Coil yoke 25 is supported by said support ledge 11e and support projection 11f, and mounted to track rail 11 with adhesive or small screws and so forth. In addition, as indicated in the drawings, each armature coil 26 is respectively wound in the form of, for example, a roughly rectangular loop (and including those shaped in the form of a diamond or parallelogram).

As indicated in FIG. 4, electronic component group 28, consisting of an IC, transistors and so forth, is provided on the lower surface of coil yoke 25. Wiring for electrically connecting these electronic components is provided by etching and so forth on the upper surface of coil yoke 25.

In addition, as indicated in FIGS. 2 and 4, thin boards 29, made of plastic and so forth, are attached to the upper surface of each armature coil 26 for mounting each of said armature coils.

On the other hand, the secondary side is composed in the manner described below.

Figure 5:
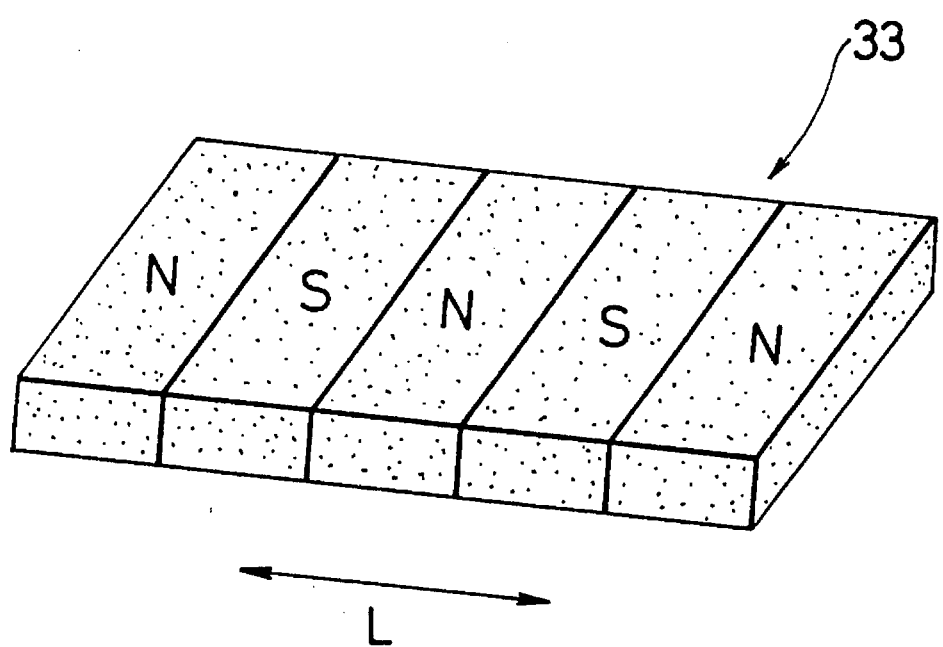
FIG. 5 is a perspective view of a field magnet equipped on the direct drive unit indicated in FIGS. 2 through 4.

As indicated in FIG. 4, said secondary side has magnet yoke 32 attached to the lower surface of casing 16, a constituent member of sliding unit 13, and field magnet 33 composed of a permanent magnet attached to the bottom of said magnet yoke 32 in opposition to each of the above-mentioned armature coils 26 of the primary side. As is clear from FIG. 5, field magnet 33 is formed overall roughly into the shape of a rectangular plate (including that formed into the shape of a diamond or parallelogram), and is magnetized so that a plurality of, and in this case 5, N and S magnetic poles are alternately arranged along the lengthwise direction of track rail 11, or in other words, direction L in which there is relative movement of the primary and secondary sides.

Next, the following provides an explanation of the linear encoder for positional detection of sliding unit 13 with respect to track rail 11.

As is indicated in FIGS. 2 and 4, board 29 provided on track rail 11 extends farther to the outside than the edge of armature coil 26, and a detecting element in the form of electromagnetic conversion element 37 is mounted on the top (or bottom) of this extending portion. Said electromagnetic conversion element 37 detects changes in magnetic field in the form of changes in the value of electrical resistance, and a plurality of said electromagnetic conversion elements 37 are, for example, arranged in a row along the track at prescribed intervals at locations corresponding to each armature coil 26 as indicated in FIG. 2. Although not indicated in the drawings, an output signal acquisition device in the form of a connection cable or flexible board is provided on the stationary side for obtaining output signals from these electromagnetic conversion elements 37.

In addition, a detected element in the form of permanent magnet 38 is mounted by means of magnet yoke 39 on the bottom surface of sliding unit 13 so as to be in opposition to these electromagnetic conversion elements 37. Changes in the magnetic field accompanying movement of sliding unit 13 are then detected by said electromagnetic conversion elements 37.

Figure 6:
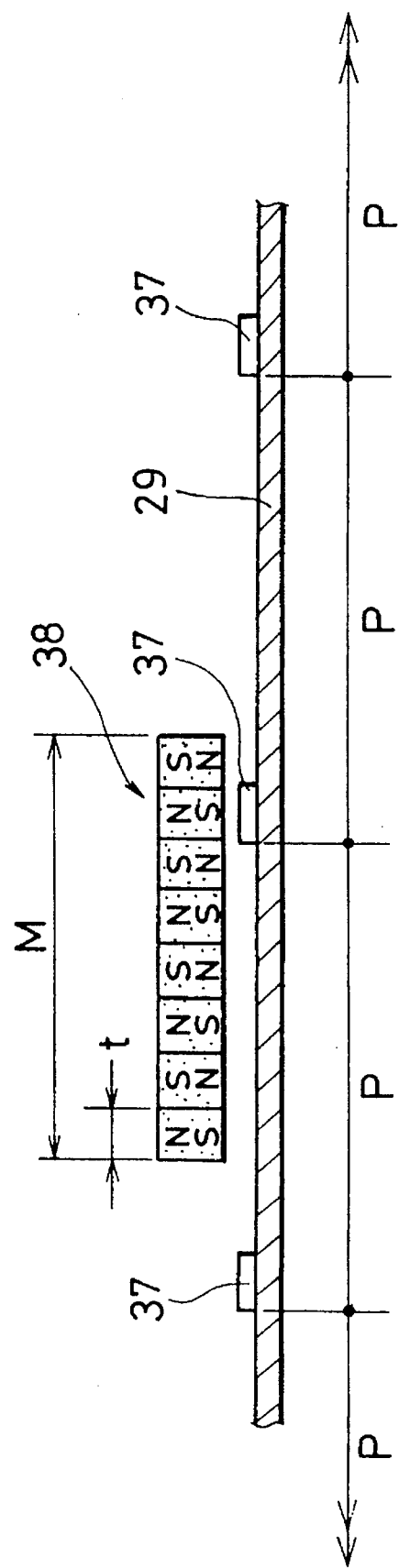
FIG. 6 is an enlarged explanatory drawing of the essential components of the linear encoder pertaining to the present invention.

The following provides a detailed explanation of the above-mentioned linear encoder based on FIG. 6.

FIG. 6 indicates an enlarged view of the position and length of permanent magnet 38 with respect to the direction of movement of sliding unit 13, or in other words, the direction of orientation of electromagnetic conversion elements 37. As is clear from said drawing, permanent magnet 38 is magnetized with a plurality of, for example, 8 S and N magnetic poles arranged in alternating fashion in the direction of the track.

In said constitution, when permanent magnet 38 moves along the track together with sliding unit 13, a change occurs in the resistance value corresponding to the change in the magnetic field in electromagnetic conversion elements 37 in opposition to said permanent magnet 38. After permanent magnet 38 passes over a specified electromagnetic conversion element 37, changes in the resistance value occur successively in each electromagnetic conversion element 37 as a result of a similar change in the magnetic field being applied to the adjacent electromagnetic conversion element 37. The change in the output of each electromagnetic conversion element 37 based on the change in this resistance value is detected. The position of sliding unit 13 can then be determined by signal processing and computation. For example, after setting a reference position in advance, it should then be determined from what electromagnetic conversion element 37 an output was produced with respect to said reference position.

Furthermore, as described above, since permanent magnet 38 is multipolar magnetized so that the S and N magnetic poles are alternating, an output signal can be obtained that corresponds to the number of each magnetic pole with each electromagnetic conversion element 37. As a result, the resolution of position detection can be improved. However, in cases when such a degree of high resolution is not required, permanent magnet 38 may be composed of a single magnetic pole instead of the multiple number of magnetic poles as described above.

In addition, electrical division and processing of the output waveforms of electromagnetic conversion elements 37 allows resolution to be increased further.

In the present embodiment, the following constitution is employed in order to obtain the output from each electromagnetic conversion element 37 in the most efficient manner.

More specifically, as indicated in FIG. 6, when the total length of permanent magnet 38 in the track direction is taken to be M, and the arrangement pitch of each magnetic pole (N,S) of said permanent magnet 38 and each electromagnetic conversion element 37 is taken to be t and p, respectively, a constitution is formed so that M=p−t.

Together with this eliminating any dead areas in position detection as a result of any magnetic pole always acting only on a specific electromagnetic conversion element 37, it also results in the obtaining of only one detection output at all times. Thus, signal processing, computation and so forth following detection signal output can be performed efficiently.

Furthermore, although a linear motor is used for the driving device in the above-mentioned embodiment, the present invention is not limited to a type that uses this particular driving device.

In addition, although a guiding device in the form of rolling elements in the form of balls 14 circulating within sliding unit 13 is used in the above-mentioned embodiment, a guiding device of a different constitution may also be applied. In addition, although balls are used for the rolling elements in the above-mentioned embodiment, a constitution may also be employed in which rollers are used.

Moreover, although the detection device that detects the position of sliding unit 13 with respect to track rail 11 is composed of electromagnetic conversion elements 37 and permanent magnet 38, the present invention is not limited to said constitution, but rather various other combinations can also be applied, such as, for example, a constitution wherein a light reflecting plate is used for the detected element and this light reflecting plate is detected by optical detecting elements.

According to the present invention as explained above, since a detecting device, to which a connection cable and so forth is connected for the obtaining of output signals, is provided on the stationary side, the pulling around of said connection cable is not required, which together with simplifying the constitution, offers a first advantage of facilitating smooth operation of the moving side due to said connection cable not hindering the operation of the moving side.

In addition, according to the present invention, since a long permanent magnet 8 like that of the apparatus of the prior art is not required, the apparatus can be reduced in size, thus offering a second advantage of the present invention.

What is claimed is:

1. A linear encoder that performs positional detection of relative motion of two objects, said encoder comprising:

a detecting element comprising a plurality of electromagnetic conversion elements arranged in a row at equal intervals in a direction of relative motion of the two objects on a stationary one of the two objects;

a detected element comprising a multipolar magnet having a plurality of poles arranged in a row in the direction of relative motion and with alternating polarity, said multipolar magnet having a first exposed end surface and a second exposed end surface at opposite ends of said magnet in the direction of relative motion, said multipolar magnet being secured to a moving one of the two objects so as to oppose said electromagnetic conversion elements when the moving one of the two objects is moved in the direction of relative motion, wherein a resistance value of said electromagnetic conversion elements changes with changes in the magnetic field caused by relative movement of the two objects; and an output signal acquisition device associated with the stationary one of the two objects for detecting a change in an output of each of said electromagnetic conversion elements based on the changes in the magnetic field, wherein a total length of said multipolar magnet from said first exposed end surface to said second exposed end surface equals a distance between adjacent ones of said electromagnetic conversion elements minus an arrangement pitch of the poles of said multipolar magnet.

2. The linear encoder as recited in claim 1, wherein said multipolar magnet comprises a permanent magnet.

3. A guide unit equipped with a track rail in which tracks are formed in a lengthwise direction, a slider guided by said tracks, and a linear encoder for detecting a position of said slider with respect to said track rail, wherein said linear encoder comprises:

a plurality of electromagnetic conversion elements arranged in a row at prescribed intervals along said tracks on said track rail;

a multipolar magnet having a plurality of poles arranged in a row in a direction of relative motion of the slider on the track rail and with alternating polarity, said multipolar magnet being secured to said slider so as to oppose said electromagnetic conversion elements when said slider is moved along the track rail, wherein a resistance value of said electromagnetic conversion elements changes with change in the magnetic field caused by movement of said slider with respect to said track rail; and an output signal acquisition device associated with the track rail for detecting a change in an output of each of said electromagnetic conversion elements based on the changes in the magnetic field, wherein said multipolar magnet has a first exposed end surface and a second exposed end surface at opposite ends of said multipolar magnet in the lengthwise direction, and wherein a total length of said multipolar magnet from said first exposed end surface to said second exposed end surface equals a distance between adjacent ones of said electromagnetic conversion elements minus an arrangement pitch of the poles of said multipolar magnet.

4. The guide unit described in claim 3, wherein said multipolar magnet comprises a permanent magnet.

5. The linear encoder as recited in claim 3, further comprising a linear motor for driving said slider with respect to said track rail.

6. The linear encoder as recited in claim 3, wherein said slider has a rolling element circulating path, said track rail has a corresponding track groove, and a plurality of rolling elements are circulated between said circulating path and said track groove to facilitate relative motion between said slider and said track rail.

7. The linear encoder as recited in claim 6, wherein said rolling elements comprise balls.

8. The linear encoder as recited in claim 6, wherein said rolling elements comprise rollers.

* * * * *